United States Patent [19]

Tsuyama et al.

[11] Patent Number: 5,148,884
[45] Date of Patent: Sep. 22, 1992

[54] SLIP CONTROL SYSTEM FOR AUTOMOTIVE VEHICLE

[75] Inventors: Toshiaki Tsuyama; Kazutoshi Nobumoto; Kaoru Sotoyama; Toru Onaka, all of Hiroshima, Japan

[73] Assignee: Mazda Motor Corporation, Aki, Japan

[21] Appl. No.: 678,490

[22] Filed: Apr. 1, 1991

[30] Foreign Application Priority Data

Mar. 30, 1990 [JP] Japan ................................ 2-86208

[51] Int. Cl.⁵ .............................................. B60K 31/00
[52] U.S. Cl. .................................. 180/197; 364/426.03
[58] Field of Search ..................... 180/197; 364/426.03

[56] References Cited

U.S. PATENT DOCUMENTS

| | | | |
|---|---|---|---|
| 4,884,651 | 12/1989 | Harada et al. | 364/426.03 X |
| 4,955,448 | 9/1990 | Ise et al. | 364/426.03 X |
| 4,987,966 | 1/1991 | Fujita | 364/426.03 X |
| 5,002,148 | 3/1991 | Miyake et al. | 364/426.03 X |
| 5,009,294 | 4/1991 | Ghoneim | 364/426.03 X |
| 5,014,202 | 5/1991 | Thatcher | 364/426.03 |
| 5,022,483 | 6/1991 | Tsuyama et al. | 180/197 |
| 5,041,978 | 8/1991 | Nakayama et al. | 180/197 X |
| 5,072,995 | 12/1991 | Kawamura et al. | 180/197 X |
| 5,077,672 | 12/1991 | Nobumoto et al. | 180/197 X |
| 5,092,420 | 3/1992 | Sugawara et al. | 180/197 |
| 5,103,398 | 4/1992 | Akiyama | 364/426.03 X |

*Primary Examiner*—D. Glenn Dayoan
*Attorney, Agent, or Firm*—Fish & Richardson

[57] ABSTRACT

A slip of the driven wheels is converged by causing the torque generated by the engine to be reduced and applying braking force when a slip of the driven wheel becomes large during accelerating. Control of the application of the braking force to the left-hand and right-hand driven wheels is made individually and separately from each other. When such an incident occurs as causing no normal control of decreasing the torque generated by the engine to be made, the contents of control of application of the braking force is changed so as to apply the same degrees of the braking force to both of the left-hand and right-hand driven wheels.

27 Claims, 6 Drawing Sheets

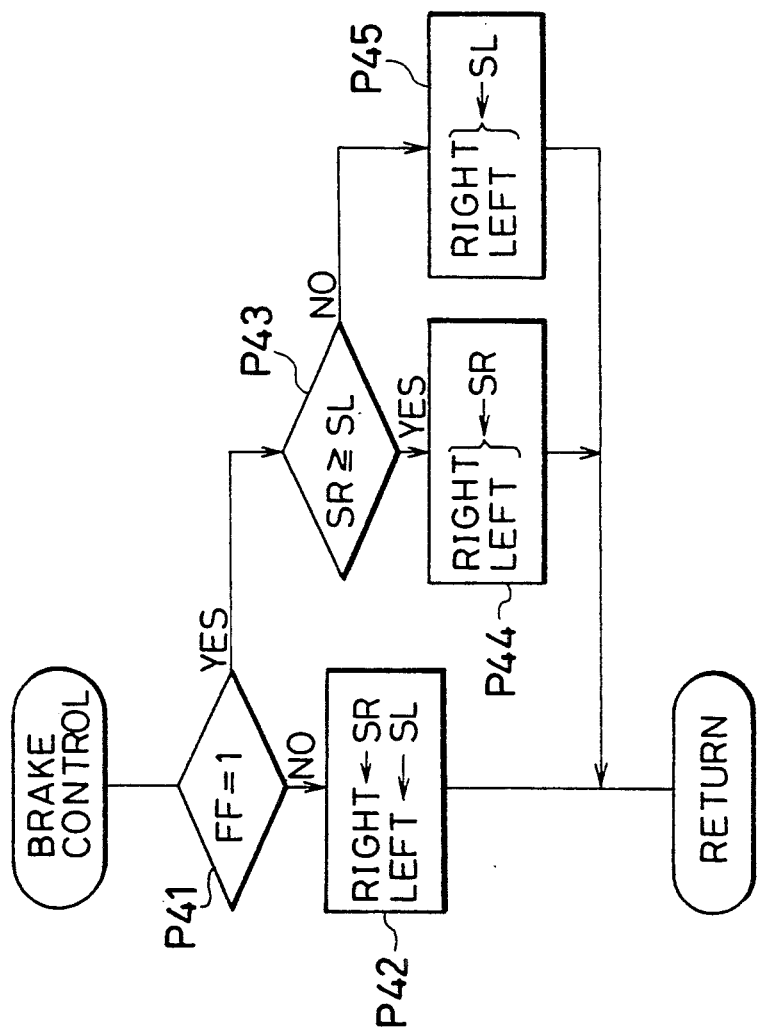

SLIP CONTROL SYSTEM FOR AUTOMOTIVE VEHICLE

BACKGROUND OF THE INVENTION

1. Title of the Invention

The present invention relates to a slip control system for an automotive vehicle and, more particularly, to a slip control system for an automotive vehicle capable of preventing an excessive slip of the driven wheel of the automotive vehicle at the time of starting off or accelerating by adjusting or controlling torque applied to the driven wheels during running on the road having a low road surface friction coefficient $\mu$, such as frozen road.

2. Description of Related Art

U.S. Pat. No. 4,884,651 discloses technology in which torque for driving the wheels is decreased by decreasing output of the engine when a slip ratio of the driven wheel on a road surface reaches a predetermined value or higher in order to reduce torque for driving the wheels and allow the driven wheel to recover its grip, thereby suppressing the driven wheels from slipping.

A slip control system is known, which further comprises braking force controlling means for recovering a grip of the driven wheel having a slip ratio higher than the other driven wheel by braking the left-hand and right-hand driven wheels at different force, in addition to output controlling means of the engine, in order to effectively suppress the slip of the driven wheel.

Although such a slip control system as having the braking force controlling means for separately controlling the left-hand and right-had driven wheels, in addition to the output controlling means for controlling the output of the engine, presents the advantage that slip of the incipiently slipping driven wheel can be suppressed effectively, it suffers from the disadvantage that running stability of the automotive vehicle may be decreased due to an imbalance of the driving torque between the left-hand and right-hand driven wheel as a result of application of the braking force to the incipiently slipping driven wheel only, because control over the slip of the automotive vehicle is made only by the braking force controlling means when the output controlling means of the engine would cause an incident and the automotive vehicle would get out of control.

SUMMARY OF THE INVENTION

Therefore, the object of the present invention is to provide a slip control system for an automotive vehicle so adapted as to individually and separately brake the left-hand and right-hand driven wheels, in addition to control of the output of the engine, thereby allowing the prevention of decrease in running stability of the automotive vehicle if the engine output controlling means would get out of control.

In order to achieve the aforesaid object, the slip control system of the present invention is provided with control state changing means for adjusting or changing a state of control over the braking force so as to make the braking force to be applied to the left-hand driven wheel equal to the right-hand driven wheel, when the engine causes an incident and gets out of control.

Specifically, the present invention consists of a slip control system for an automotive vehicle, comprising:

first slip control means for controlling a slip of a driven wheel so as not to become excessive by control of torque generated by an engine;

second slip control means for controlling a slip of each driven wheel so as not to become excessive by controlling braking force for a right-hand driven wheel and a left-hand driven wheel individually and separately from each other;

incident detecting means for detecting occurrence of such an incident as causing the first slip control means to work in an abnormal way; and control state changing means for changing a state of control by the second slip control means so as to make the braking force to be applied to the right-hand driven wheel and the left-hand driven wheel equal to each other when the incident has been detected by the incident detecting means.

In accordance with the present invention, the slip control system is constructed to adjust or change the state of control of the braking force so as to apply the equal braking force to the left-and and right-hand driven wheels at the time of occurrence of such an incident as making the output of the engine uncontrollable in a normal way. Hence, the present invention has the advantages that the decrease in running stability of the automotive vehicle can be prevented at the time of occurrence of the incident and the slip of the incipiently slipping driven wheel can be suppressed in an effective way during an ordinary running state.

Other objects, features and advantages of the present invention will become apparent in the course of the description of the preferred emboddiments, which follows, with reference to the accompanying drawings.

BRIEF DESCRIPTION OF THE PREFERRED EMBODIMENTS

FIG. 6 is a flowchart corresponding to FIG. 5, showing a variation of the present invention.

DESCRIPTION OF THE PREFERRED EMBODIMENTS

Figure 1:
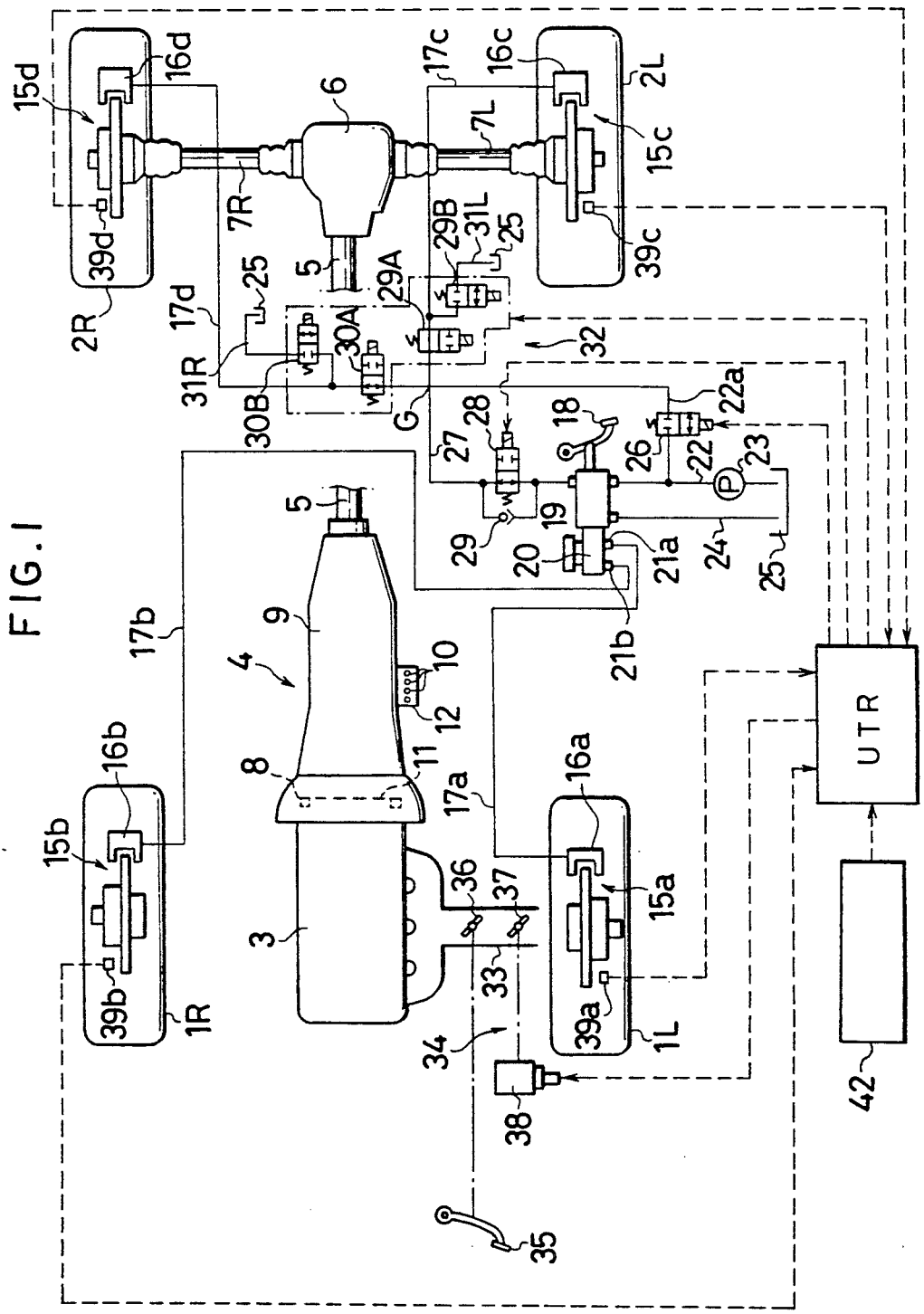
FIG. 1 is a system diagram showing a whole outline of the slip control according to an embodiment of the present invention.

As shown in FIG. 1, the automotive vehicle is shown to be of a type in which a left-hand front wheel 1L and a right-hand front wheel 1R work as undriven wheels while a left-hand rear wheel 2L and a right-hand rear wheel 2R work as driven wheels, and driving force of an engine 3 is transmitted through an automotive transmission 4, a propeller shaft 5, a differential 6 and left-hand and right-hand axles 7L and 7R to left-hand and right-hand driven wheels 2L and 2R.

The automatic transmission 4 comprises a torque converter 8 and a multi-stage shift geartrain mechanism 9, as is known per se, and plural solenoids 10 are fitted in a hydraulic pressure circuit of the multi-stage shift geartrain mechanism 9, which are so arranged as to perform a shift in speed stage or speed range by energizing and/or deenergizing the plural solenoids 10. The torque converter 8 has a lockup clutch 11 of a hydraulically operative type which is so arranged as to be coupled or uncoupled by energizing or deenergizing a solenoid 12 fitted in its hydraulic pressure circuit.

The solenoids 10 and 12 are controlled by a control signal generated from a control unit (not shown) for shift control. The control unit is so constructed, as in known per se, as to output a control signal for executing shift control and lockup control to the solenoids 10 and 12 in a predetermined manner on the basis of a predetermined shift characteristic and a predetermined lockup characteristic as well as a signal detected and generated by a throttle opening angle sensor and a vehicle speed sensor.

The left-hand front wheel 1L is equipped with a brake 15a while the right-hand front wheel 1R with a brake 15b. Likewise, the left-hand rear wheel 2L is equipped with a brake 15c while the right-hand wheel 2R with a brake 15d. To each of calipers 16a to 16d, inclusive, of the brakes 15a to 15d is connected a pipe for supplying braking pressure, identified by 17a to 17d, respectively. The force created by depressing a braking pedal 18 is transmitted to a master cylinder 20 by a servo-mechanism 19 of a liquid pressure type and the braking liquid pressure is supplied to the caliper 16a of the left-hand front wheel 1L through the pipe 17a from a first discharge outlet 21a of the master cylinder 20, while the braking liquid pressure is supplied to the caliper 16b of the right-hand front wheel 1R through the pipe 17b from a second discharge outlet 21b of the master cylinder 20.

To the servo-mechanism 19 is supplied the liquid pressure from a pump 23 through a pipe 22, and a surplus of the liquid pressure is returned to a reserve tank 25 through a return pipe 24. A branch pipe 22a branched off from the pipe 22 is communicated to a merging section G where the pipe 22a is merged with a pipe 27, as will be described hereinafter. The liquid pressure generated by the servo-mechanism 19 is supplied to the merging section G through the pipe 27 which in turn is equipped with an opening-closing valve 28 of an electromagnetic type. The pipe 27 is further equipped with a one-way valve 29 in parallel with the opening-closing valve 28 in order to allow a flow of braking liquid or oil toward the merging section G yet shutting the flow thereof off in the opposite direction.

To the merging section G are a pipe 17c for braking the left-hand reat wheel 2L and a pipe 17d for braking the right-hand rear wheel 2R, and the pipes 17c and 17d are equipped with opening-closing valves 29A and 30A of electromagnetic type, respectively. A relief passage 31L to which an opening-closing valve 29B of an electromagnetic type is mounted is disposed on the downstream side of the opening-closing valve 29A, while a relief passage 31R to which an opening-closing valve 30A of an electromagnetic type is mounted is disposed on the downstream side of the opening-closing valve 30A.

The opening-closing valves 26, 28, 29A, 29B, 30A and 30B consitute means 32 for adjusting the left-hand and right-hand rear wheels 2L and 2R, which is controlled by a control unit UTR for slip control. Referring to FIG. 1, when no slip control is performed, the opening-closing valves 28, 29A and 30A are opened and the opening-closing valve 26 is closed, thereby allowing the braking liquid pressure to be supplied from the master cylinder 20 to the brake 15a for the left-hand rear wheel 2L and the brake 15b for the right-hand rear wheel 2R when the braking pedal 18 is depressed. To the brakes 15c and 15d for the respective rear wheels 2L and 2R is supplied the liquid pressure controlled by the servo-mechanism 19 as braking liquid pressure from the servo-mechanism 19 through the pipe 27.

In performing the control over the slip of the left-hand rear wheel 2L and the right-hand rear wheel 2R, the opening-closing valve 28 is closed and the opening-closing valve 26 is opened according to the control signal from the control unit UTR. By subjecting the opening-closing valves 29A and 29B as well as the opening-closing valves 30A and 30B to duty control, the braking liquid pressure is retained, raised or reduced. In other words, when each of the opening-closing valves 29A, 29B, 30A and 30B is closed while the opening-closing valve 26 is opened, the braking liquid pressure is retained as it is. When the opening-closing valves 29A and 30A are opened and the opening-closing valves 29B and 30B are closed, the braking liquid pressure arises. Further, when the opening-closing valves 29A and 30A are closed and the opening-closing valves 29B and 30B are opened, the braking liquid pressure is reduced. The braking liquid pressure transmitted through the branch pipe 22a is so arranged as to fail to act as reaction force against the braking pedal 18 due to the disposition of the one-way valve 29 so as to bypass the opening-closing valve 28.

As the braking pedal 18 is depressed while the slip control is performed by the braking force controlling means 32, the braking liquid pressure from the servo-mechanism 19 is supplied to the brakes 15c and 15d for the rear wheels 2L and 2R through the one-way valve 29 in accordance with an amount in which the braking pedal 18 is depressed.

The control unit UTR for slip control is so arranged as to execute control of output for decreasing the torque of the driving torque of the engine 3 as well as to execute control of braking force by applying the braking force to the left-hand rear wheel 2L and the right-hand rear wheel 2R. The control of output is performed by a mechanism 34 for adjusting an opening angle of a sub-throttle disposed in an intake passage 33 of the engine 3. This mechanism 34 comprises a sub-throttle valve 37 disposed on the upstream side of a throttle valve 36 so disposed as to be operatively opened or closed by an accelerator pedal 35 and an actuator 38 for driving the sub-throttle valve 37. The ouput of the engine 3 is controlled by operatively opening or closing the sub-throttle valve 37 in accordance with the control signal to be generated from the control unit UTR to the actuator 38 at the time when a slip occurs.

Figure 2:
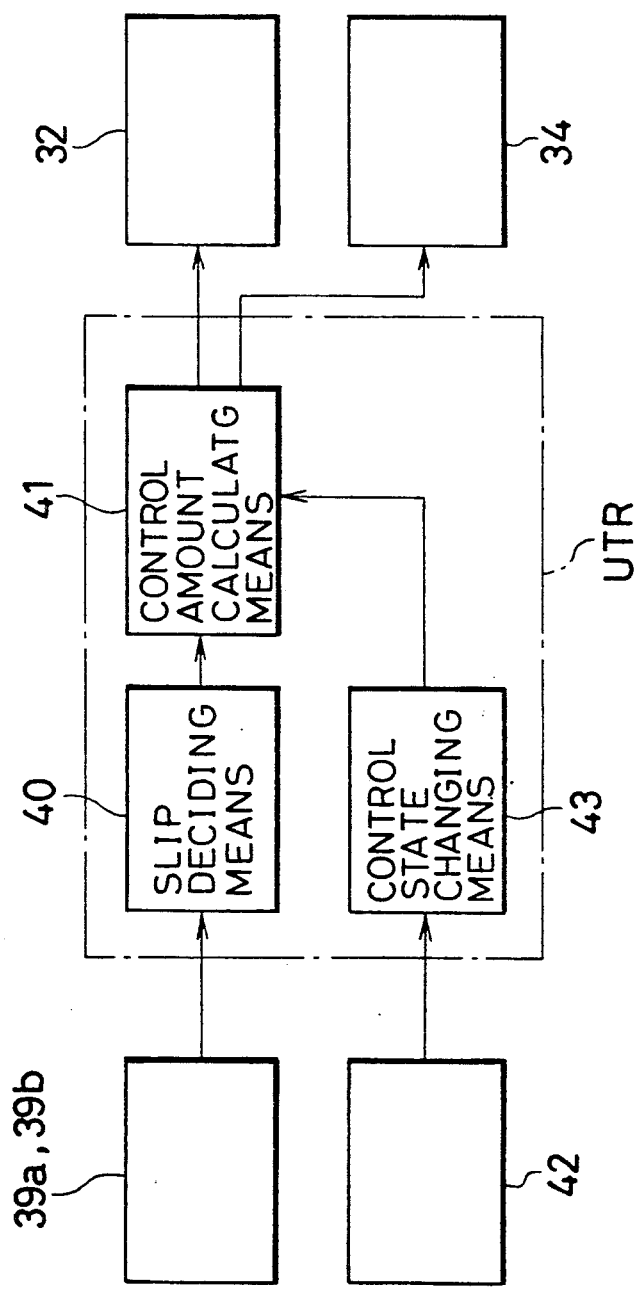
FIG. 2 is a time chart showing an example of slip control.

As shown in FIG. 2, the control unit UTR for slip control comprises slip deciding means 40, control amount calculating means 41, and control state changing means 43, slip decoding means 40 being to decide to determine if either of the driven left-hand rear wheel 2 L or right-hand rear wheel 2R shows a tendency of incipiently slipping in accordance with the signals generated from wheel speed sensors 39a to 39d for sensing the speeds of rotation of the respective front wheel 1L and 1R as well as rear wheels 2L and 2R, control amount calculating means 42 being to calculate a control amount to be generated to the mechanism 32 for adjusting the braking force in order to suppress the slip when the driven wheel is decided by the slip deciding means 40 as being incipiently slipping, and control state changing means 43 being to adjust or change the state of control of the braking force in accordance with the signals generated by incident detecting means 42 for detecting occurrence of such an incident as causing the output control of the engine 3 to be rendered uncontrollable in a normal way, as will be described hereinafter.

Figure 3:
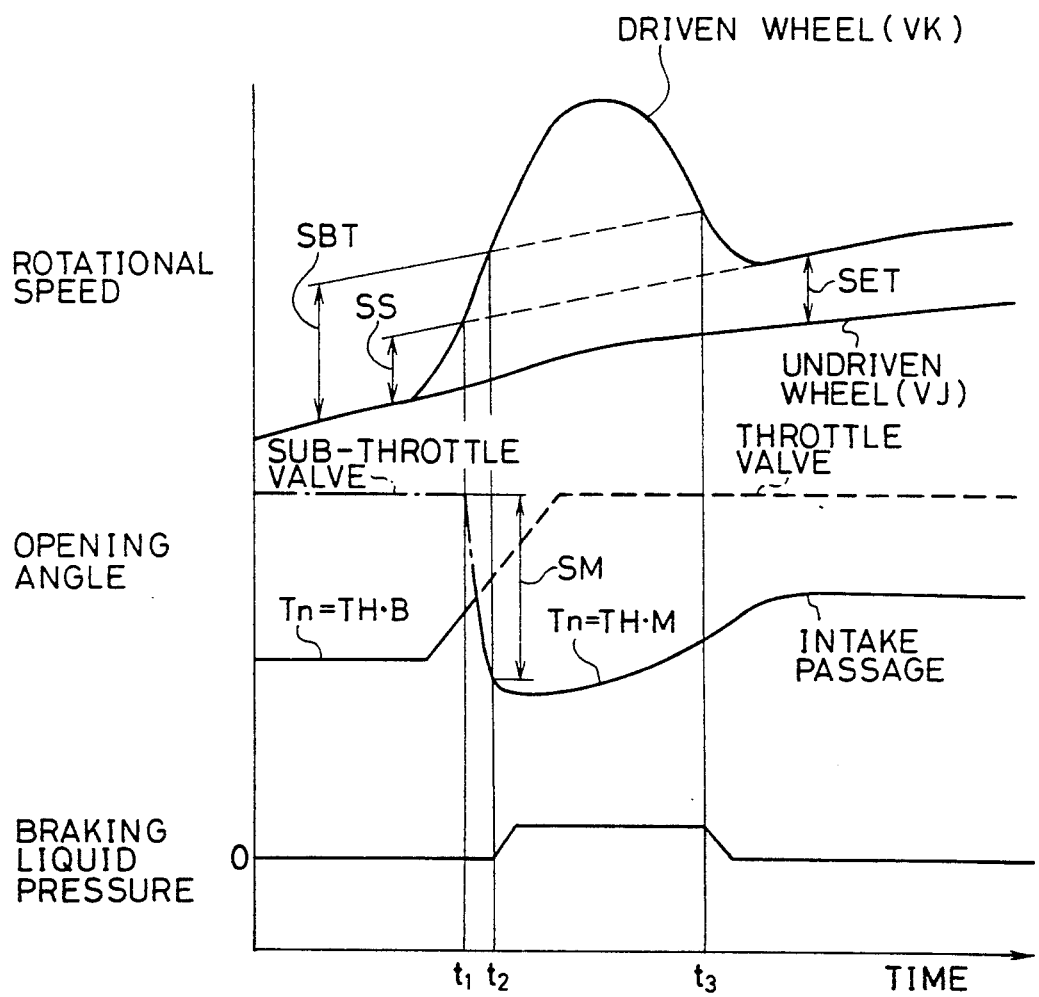
FIG. 3 is a diagrammatic representation showing a structure of a control unit.

The control unit UTR calculates a slip value of the driven wheel in accordance with each signal outputted, and slip control is executed by controlling the braking force of the left-hand rear wheel 2L and the right-hand rear wheel 2R and by controlling the output from the engine 3 in accordance with the result of calculation as shown in FIG. 3. In FIG. 3, it is noted that reference symbol "SS" denotes a reference value for a slip value working as a reference to a decision to determine if the slip control be started by either of the left-hand rear wheel 2L and the right-hand rear wheel 2R. The sub-throttle valve 37 is kept in its maximum open state at the time of accelerating, in a region up to the time t1 when the slip values of the left-hand rear wheel 2L and the right-hand rear wheel 2R increase to the reference value SS. And an opening angle Tn of the intake passage 33 is set in accordance with the opening angle of the throttle valve 36. In other words, the control of output of the engine 3 is executed by setting the opening angle Tn of the intake passage 3 in accordance with an opening angle TH.B of the throttle valve to be operatively opened or closed in correspondence witn an amount in which the accelerating pedal 35 is depressed.

The actuator 38 is then operated at the time t1 at which the slip values of the left-hand and right-hand rear wheels 2L and 2R increase in accordance with the increase in the rotational speeds thereof to the reference value SS at the time of starting the slip control, and the feed-forward control is executed in order to decrease the opening angle of the sub-throttle valve 7 by an initial preset value SM. As a result, the opening angle of the sub-throttle valve 37 is caused to be smaller than that of the throttle valve 36 and the opening angle Tn of the intake passage 33 is set in accordance with the opening angle of the sub-throttle valve 37. Thererafter, an opening angle Th.M of the sub-throttle valve 37 is subjected to feed-back control so as to make the slip value of the left-hand and right-hand rear wheel 2L or 2R a target value SET for the control of output of the engine, as will be described in detail hereinafter.

The braking oil is supplied to the brakes 15c and 15d of the respectively left-hand and right-hand rear wheels 2L and 2R at the time t2 at which the slip values of the left-hand and right-hand rear wheels 2L and 2R further increase from the time t1 when the slip control has started and the slip values thereof exceed the target value SBT for the control of braking force, as will be described more in detail hereinafter. And the braking force of the left-hand and right-hand rear wheels 2L and 2R is subjected to feed-back control up to the time t3 at which the slip value of the rear wheel 2L or 2R becomes the target value or lower.

Figure 4:
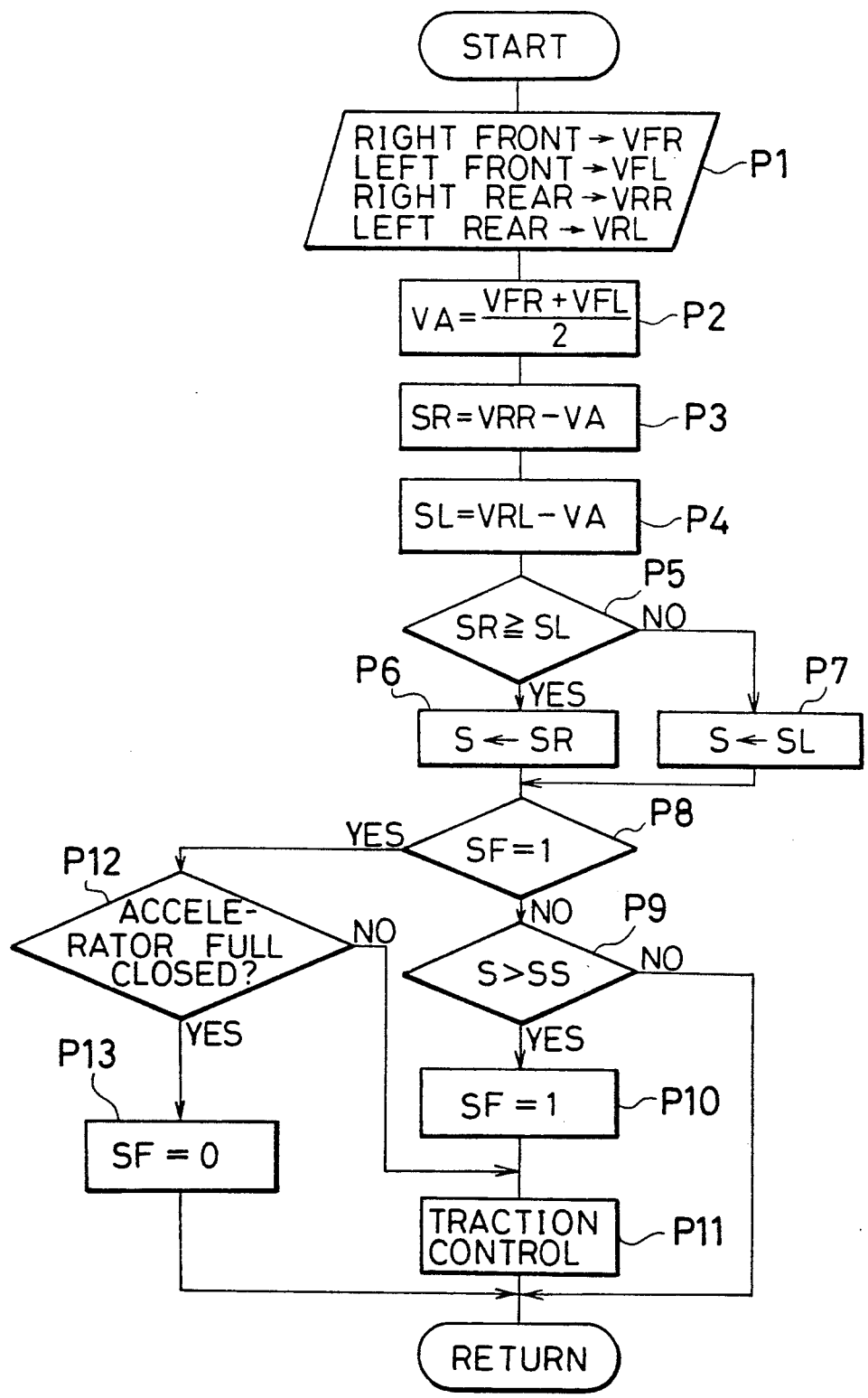
FIGS. 4 and 5 are each a flowchart showing a control example according to the present invention.
Figure 5:
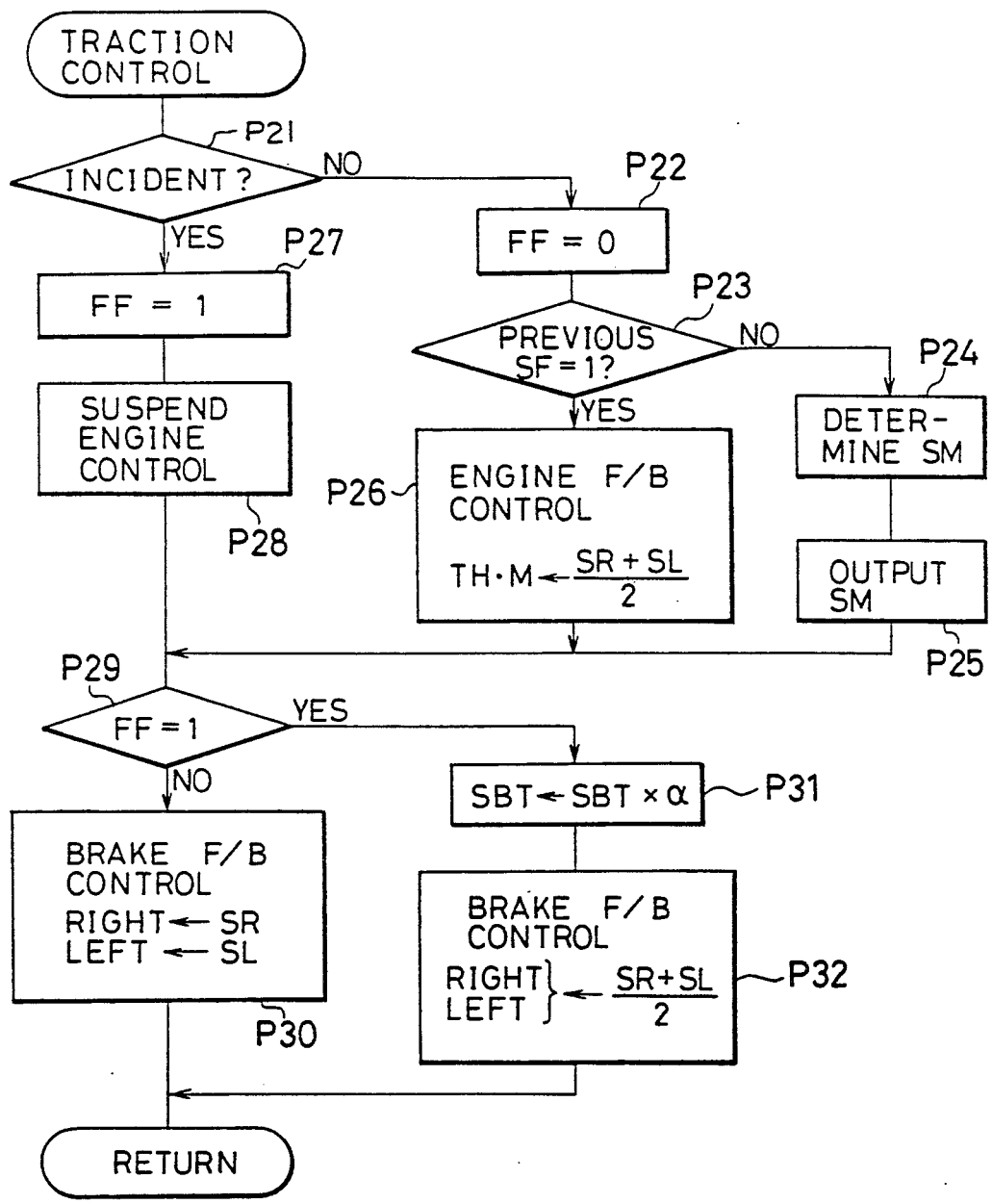

Description will be made of the operation of slip control by the control unit UTR with reference to the flowchart as shown in FIGS. 4 and 5.

As shown in FIG. 4, wheel speeds (speeds of rotation) VFR, VFL, VRR and VRL for the right-hand front wheel, left-hand front wheel, right-hand rear wheel and left-hand rear wheel, respectively, are read at step P1. Then, at step P2, an assumed vehicle speed VA is set as the average of the rotational speeds VFR and VFL for the respective right-hand and left-hand front wheels as the undriven wheels.

Then, at step P3, a slip value SR for the right-hand rear wheel as a driven wheel is calculated by substracting the rotational speed VA from the rotational speed VRR for the right-hand rear wheel. Likewise, at step P4, a slip value SL for the left-hand rear wheel is calculated by subtracting the rotational speed VA from the rotational speed VRL for the left-hand rear wheel.

At step P5, a decision is made to determine if the slip value SR for the right-hand rear wheel is equal to or larger than the slip value SL for the left-hand rear wheel, followed by proceeding to step P6 or step P7 at either of which the slip value equal to or larger than the other slip value is set to a slip value S. Then the program flow goes to step P8 at which a decision is made to determine if a slip flag SF is set to one. The setting of the slip control to one means that the automotive vehicle is in the process of slip control. When a result of the decision at step P8 indicates that the slip flag SF is not set to one, i.e. that the automotive vehicle is not in the process of slip control, then the program flow goes to step P9 at which a decision is made to determine if the slip value S set at step P6 or P7 is larger than a reference value SS for starting the slip control. When it is decided at step P9 that the slip value S is equal to or smaller than the reference value SS, then the program flow is returned as it is because no slip control. i.e. no traction control, is required.

On the other hand, when a result of the decision at step P9 indicates that the slip value S is larger than the reference value SS, the program flow goes to step P10 at which the slip flag SF is set to one, followed by step P11 at which traction control will be performed in a manner as will be described hereinafter.

When a result of the decision at step P8 indicates that the slip flag SF is set to one, then the program flow goes to step P12 at which a decision is made to determine if an accelerator is full closed, i.e. if the traction control is to be suspended. When it is decided at step P12 that the accelerator is full closed, the slip flag SF is reset to zero at step P13, followed by the return of the flow and the end of the traction control.

FIG. 5 indicates the contents of control as indicated by step P11 in FIG. 4.

First, at step P21, a decision is made to determine if an incident occurs to such an extent to which no normal traction control can be performed by control of the output from the engine. Possible states for an incident may include, for example, abnormality in operation of the sub-throttle valve 38, a breakdown of an input or output path of a signal detected and a control signal, and so on.

When a result of the decision at step P21 indicates that such an incident has not occurred, then the program flow goes to step P22 at which an incident flag FF is set to zero. Thereafter, at step P23, a decision is made to determine if the latest slip flag SF is set to one. When a result of the decision at step P23 indicates that the latest slip flag SF is not set to one, it is the time t1 in FIG. 2, at which the slip value of the driven wheel exceeds the reference value SS for the first time. In this case, the output of the engine is rapidly reduced by SM by the processing at step P24 and step P25 (feed-forward control).

On the other hand, when it is decided at step P23 that the latest slip flag SF is set to one, then the program flow goes to step P26 at which the output of the engine, i.e. an opening angle of the sub-throttle valve 37, is subjected to feed-back control. In the feed-back control, an actual slip value of the driven wheel is processed to a target value SET for the engine. In this case, the average of the slip value SR of the right-hand driven wheel and the slip value SL of the left-hand driven wheel is employed as an actual slip value of the driven wheel. In other words, the opening angle of the sub-throttle valve 37 is determined, which is required to make the average of the rotational speeds of the left-hand and right-hand driven rear wheels a target rotational speed corresponding to the target value SET, and then the actuator 38 is controlled to assume the determined opening angle.

When a result of the decision at step P21 indicates that the incident has occurred, then the program flow goes to step P27 at which the incident flag FF is set to one, followed by step P28 at which the traction control by the control of the output of the engine is suspended.

After steps P25, P26 or P28, the traction control is performed using the brake at step P29 et seq.

Then, at step P29, a decision is made to determine if the incident flag FF is set to one. When it is decided at step P29 that the incident flag FF is not set to one, then the program flow goes to step P30 at which the left-hand and right-hand rear wheels are braked individually and separately (feed-back control). In the control at step P30, the right-hand driven wheel is braked so as to make its slip value SR (the rotational speed VRR for the right-hand driven wheel) a target braking value SBT (a target rotational speed corresponding to SBT), while the left-hand driven wheel is braked so as to make its slip value SL assume the target value SBT. It is to be noted that, in the control at step P30, the right-hand driven wheel may differ in a control amount from the left-hand driven wheel due to the difference of the slip value SR from the slip value SL.

When a resulf of the decision at step P29 indicates that the incident flag FF is set to one, then the program flow goes to step P31 at which a target value SBT at the time of occurrence of an incident is set by multiplying the target value SBT for braking at ordinary running by correction coefficient $a(a<1)$. Thereafter, at step P32, the right-hand and left-hand driven wheels are braked individually and separately according to the feed-back control, like at step P30. At step P32, however, the target value SBT is so set as to become smaller than at step P30 and a control amount is so set as to brake both of the right-hand and left-hand driven wheels at the identical braking force. In order to achieve the identical control amounts for both of the right-hand and left-hand driven wheels, a pseudo-slip value is employed for an actual slip value. As shown in FIG. 5, the average of the slip value SR for the right-hand driven wheel and the slip value SL for the left-hand driven wheel is employed for the pseudo-slip value. It is also possible to employ the average of the rotational speed VRR for the right-hand driven wheel and the rotational speed VRL for the left-hand driven wheel as a pseudo-rotational speed and to perform control so as to make the pseudo-rotational speed a target rotational speed correspoonding to the target value SBT.

By changing the target value SBT to a smaller valve at step P31, failure to perform the traction control by the engine is guaranteed. This is advantageous in order to converge a slip of the driven wheel as soon as possible. It is to be noted that the process at step P31 may be deleted.

It is further to be noted that, as an average slip value (an average rotational speed) of the right-hand and left-hand driven wheels is employed as a pseudo-slip value, a slip of the driven wheel having a greater rotational speed and a higher tendency to slip can be suppressed, while the application of excessive braking force to the driven wheel having a smaller rotational speed and a lower tendency to slip can be prevented. In other words, a good balance between the suppression of a slip and the achievement of acceleration can be given.

FIG. 6 shows a variant of the slip control system according to the present invention and it is noted that FIG. 6 indicates a portion corresponding to FIG. 5. In FIG. 6, step P42 corresponds to step P30 in FIG. 5 and steps P43 to P45 of FIG. 6 correspond to the step P32 of FIG. 5. The variant as shown in FIG. 6 employs a slip value of the right-hand driven wheel or the left-hand driven wheel, whichever larger, as a pseudo-slip value (a pseudo-rotational speed) for the driven wheel. This can be said that more importance is placed upon the suppression of a slip more than acceleration. Conversely, a slip value of the right-hand driven wheel or the left-hand driven wheel, whichever smaller, may be employed as a pseudo-slip value. This is said to place more importance upon acceleration than upon the suppression of a slip.

The present invention has been described by way of examples. It is noted, however, that the torque generated by the engine may conveniently be adjusted by adjusting an amount of intake air or ignition timing. Further, as a slip value of the driven wheel, there may be employed the difference between the wheel speeds of the undriven wheel and the driven wheel or a ratio of the driven wheel to the undriven wheel. The ratio may be represented by a ratio in wheel speed of the driven wheel to the undriven wheel or a ratio of the difference between the wheel speeds of the driven wheel and the undriven wheel to the wheel speed of the undriven wheel.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A slip control system for an automotive vehicle, comprising:
    first slip control means for controlling a slip of a driven wheel so as not to become excessive by control of torque generated by an engine;
    second slip control means for controlling a slip of each driven wheel so as not to become excessive by controlling braking force for a right-hand driven wheel and a left-hand driven wheel individually and separately from each other;
    incident detecting means for detecting occurrence of such an incident as causing the first slip control means to work in an abnormal way; and
    control state changing means for changing a state of control by the second slip control means so as to make the braking force to be applied to the right-hand driven wheel and the left-hand driven wheel equal to each other when the incident has been detected by the incident detecting means.

2. A slip control as claimed in claim 1, wherein an amount of control for the right-hand driven wheel is made equal to an amount of control for the left-hand driven wheel when the state of control is changed by the control state changing means.

3. A slip control as claimed in claim 2, wherein an amount of control by the second slip control means when the state of control is changed is determined on the basis of an average of a slip value of the right-hand driven wheel and a slip value of the left-hand driven wheel.

4. A slip control as claimed in claim 2, wherein an amount of control by the second slip control means is determined on the basis of either of a slip value of the right-hand driven wheel or a slip value of the left-hand driven wheel, whichever larger.

5. A slip control as claimed in claim 2, wherein an amount of control by the second slip control means is determined on the basis of either of a slip value of the right-hand driven wheel or a slip value of the left-hand driven wheel, whichever smaller.

6. A slip control as claimed in claim 1, wherein:
control by the first slip control means is based on feed-back control so as to make an actual slip value of a driven wheel a predetermined first target value;
control by the second slip control means is based on feed-back control so as to make an actual slip value of the right-hand driven wheel and an actual slip value of the left-hand driven wheel respectively predetermined second target values; and
the second target value is set as a value larger than the first target value.

7. A slip control as claimed in claim 6, wherein:
the control by the first slip control means starts as either of the slip value of the right-hand driven wheel or the slip value of the left-hand driven wheel, whichever larger, becomes equal to or larger than a predetermined starting threshold value; and
the second target value is set as a value which is larger than the starting threshold value.

8. A slip control as claimed in claim 7, wherein the first target value is set as a value which is equal to or smaller than the starting threshold value.

9. A slip control as claimed in claim 1, wherein the control by the first slip control means is suspended when the incident has been detected by the incident detecting means.

10. A slip control as claimed in claim 1, wherein the control by the second slip control means is delayed from a start of the control by the first slip control means.

11. A slip control system for an automotive vehicle, comprising:
torque adjusting means for adjusting torque generated by an engine;
braking force adjusting means for adjusting braking force to be applied to a right-hand driven wheel and a left-hand driven wheel individually or separately from each other;
slip value detecting means for detecting a slip value of the right-hand driven wheel and a slip value of the left-hand driven wheel individually and separately from each other;
slip value determining means for the engine for determining a slip value for the engine on the basis of the slip value of the right-hand driven wheel and the slip value of the left-hand driven wheel detected by the slip value detecting means;
first slip control means for controlling the torque adjusting means so as to allow the slip value for the engine determined by the first slip control means to reach a predetermined first target value;
second slip control means for controlling the braking force adjusting means so as to allow the slip value of the right-hand driven wheel and the slip value of the left-hand driven wheel detected by the slip value detecting means to reach respectively predetermined second target values;
incident detecting means for detecting occurrence of such an incident as causing the first slip control means to work in an abnormal way; and
control state changing means for changing a state of control by the second slip control means so as to make an amount of control for the right-hand driven wheel and an amount of control for the right-hand driven wheel equal to each other when the incident has been detected by the incident detecting means.

12. A slip control as claimed in claim 11, wherein the control by the first slip control means is suspended when the incident has been detected by the incident detecting means.

13. A slip control as claimed in claim 11, wherein the slip value detecting means for the engine determines the slip value for the engine as an average between the slip value for the right-hand driven wheel and the slip value for the left-hand driven wheel detected by the slip value detecting means.

14. A slip control as claimed in claim 11, wherein a slip value in the event of the incident is set as a common slip value between the slip value of the right-hand driven wheel and the slip value of the left-hand driven wheel when the state of control is changed; and the second slip control means subjects the slip value in the event of the incident to feed-back control so as to assume the second target value.

15. A slip control as claimed in claim 14, wherein the slip value in the event of the incident is set as an average between the slip value of the right-hand driven wheel and the slip value of the left-hand driven wheel detected by the slip value detecting means.

16. A slip control as claimed in claim 14, wherein the slip value in the event of the incident is set as either of the slip value of the right-hand driven wheel or the slip value of the left-hand driven wheel, whichever larger, detected by the slip value detecting means.

17. A slip control as claimed in claim 14, wherein the slip value in the event of the incident is set as either of the slip value of the right-hand driven wheel or the slip value of the left-hand driven wheel, whichever smaller, detected by the slip value detecting means.

18. A slip control as claimed in claim 11, wherein the slip value detecting means determines the slip value on the basis of a vehicle speed and a rotational speed of a driven wheel.

19. A slip control as claimed in claim 18, wherein the vehicle speed is assumed from plural rotational speeds out of the rotational speeds of all wheels.

20. A slip control as claimed in claim 19, wherein:
either one of front wheels or rear wheels is driven wheels and the other is undriven; and
an average between the rotational speed of the right-hand undriven wheel and the rotational speed of the left-hand undriven wheel is employed.

21. A slip control as claimed in claim 18, wherein a slip value determined by the slip value detecting means is set as a value obtainable by subtracting the rotational speed of the driven wheel from the vehicle speed.

22. A slip control as claimed in claim 11, wherein:
- an intake passage for the engine has a sub-throttle valve disposed, together with a throttle valve of a type reactive to operation of an accelerator; and
- the sub-throttle valve functions as the torque adjusting means to be controlled by the second slip control means.

23. A slip control as claimed in claim 11, further comprising third slip control means for subjecting the torque adjusting means to feed-forward control so as to temporarily reduce the torque generated by the engine to a large extent wherein the control by the first slip control means starts control by the third slip control means.

24. A slip control as claimed in claim 23, wherein the control by the third slip control means starts as the slip value detected by the slip value detecting means exceeds a predetermined starting threshold value.

25. A slip control as claimed in claim 11, wherein the second target value is set as a value larger than the first target value.

26. A slip control as claimed in claim 24, wherein:
- the first target value is set as a value equal to or smaller than the starting threshold value; and
- the second target value is set as a value larger than the starting threshold value.

27. A slip control as claimed in claim 11, wherein the second target value is changed to a smaller value when the state of control is changed by the control state changing means.

* * * * *